United States Patent [19]

Coleman et al.

[11] 4,435,646
[45] Mar. 6, 1984

[54] WIND TURBINE ROTOR CONTROL SYSTEM

[75] Inventors: Clint Coleman, Warren, Vt.; Hugh D. Currin, Klamath Falls, Oreg.

[73] Assignee: North Wind Power Company, Inc., Waitsfield, Vt.

[21] Appl. No.: 351,896

[22] Filed: Feb. 24, 1982

[51] Int. Cl.³ .............................................. F03D 7/04
[52] U.S. Cl. ...................................... 290/44; 290/55; 416/135
[58] Field of Search ...................... 290/44, 55; 416/40, 416/43, 132 B, 135 R, 135 A, 136

[56] References Cited

U.S. PATENT DOCUMENTS

| 2,547,636 | 4/1951 | Fumagalli | 290/44 |
| 4,006,925 | 2/1977 | Scherer | 290/44 X |
| 4,324,528 | 4/1982 | Svenning | 416/135 A X |
| 4,333,018 | 6/1982 | Bottrell | 290/44 X |
| 4,366,387 | 12/1982 | Carter, Jr. et al. | 290/44 X |

Primary Examiner—J. V. Truhe
Assistant Examiner—W. E. Duncanson, Jr.
Attorney, Agent, or Firm—Kenway & Jenney

[57] ABSTRACT

In a pitch control system for a wind turbine, a mechanical control system changes pitch angle of the rotor blades collectively in response to blade pitch moment. The control system is designed to be used with a downwind constant speed two-bladed horizontal axis teetering hub wind turbine. Pitch placement controls torque for a synchronous alternator connected to the electrical power grid. The pitch control system is manually lockable from the ground in run or shutdown modes. An automatic shutdown mode provides fullfeathering for protection from large amplitude vibrations or loss of the electrical grid.

16 Claims, 16 Drawing Figures

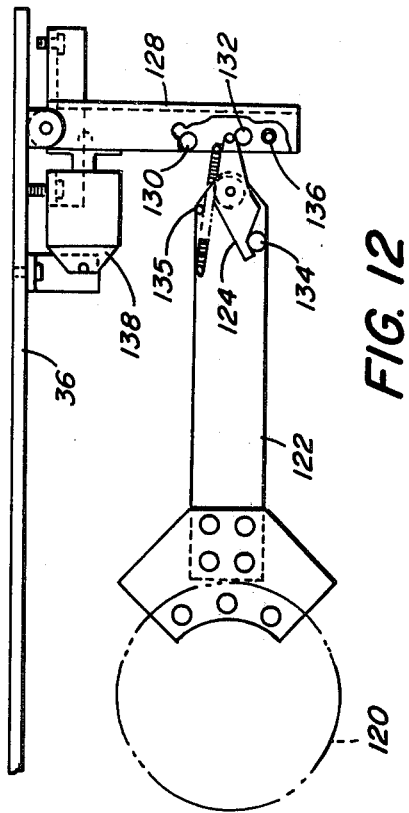
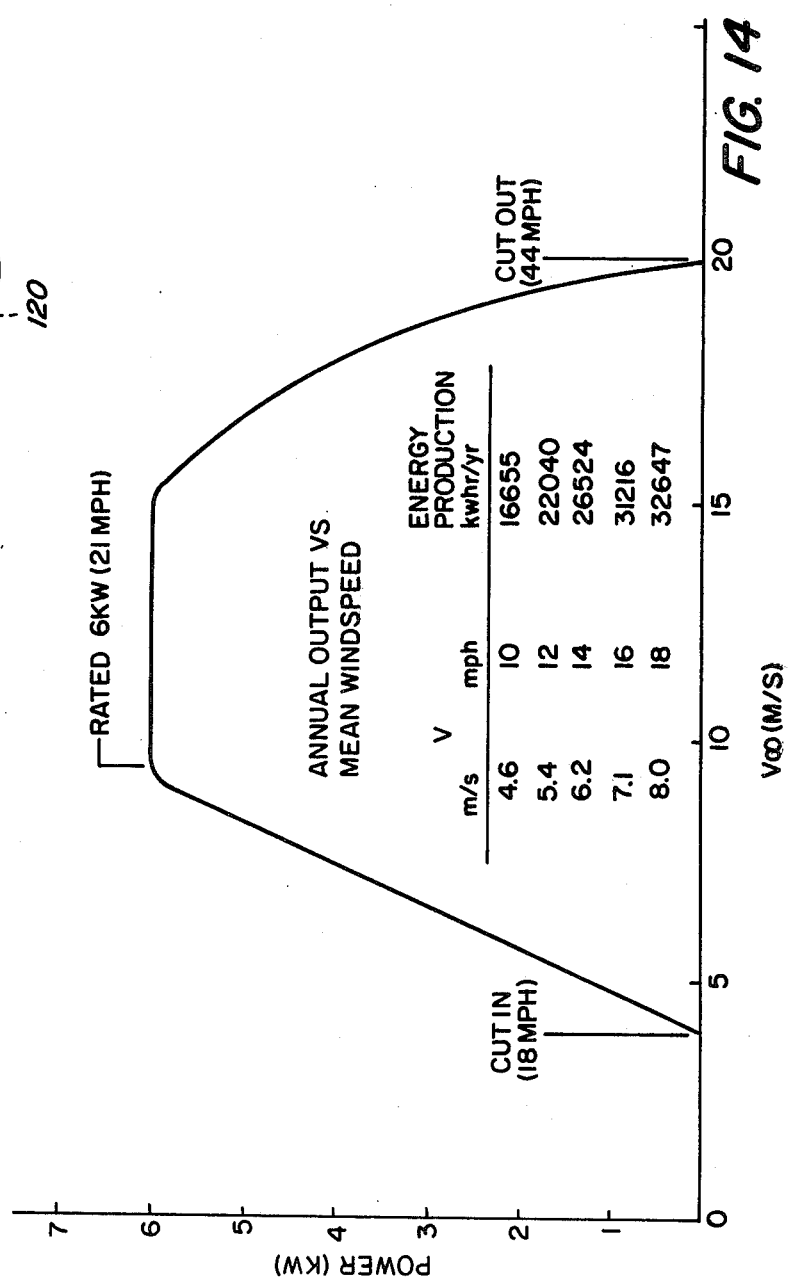

WIND TURBINE ROTOR CONTROL SYSTEM

STATEMENT

The Government has rights in this invention pursuant to Contract No. DE-ACO4-76DPO3533 awarded by the U.S. Department of Engery.

BACKGROUND OF THE INVENTION

The invention relates generally to wind turbine rotor control systems, and more particularly, to automatic pitch control systems for wind turbines. Prior to implementation of the rural electrification program, wind driven electrical generators were in common use primarily for direct current generation. Up until at least 1950, these wind turbines were all variable speed. Some of them employed blade load parameters for rotor controland blade feathering for RPM control. For example, the Jacobs hub, the Allied hub and the Win Power hub all utilized blade centrifugal loads to control peak RPM. Following the renewed interest in wind power in the past decade, various new rotor control systems have been developed. First, feathering controls have been developed to reduce blade pitch in response to RPM or rotor power. Second, stall controlling systems have been designed for increasing the blade pitch to stall the air foil thereby limiting rotor RPM or rotor power. Third, rotors have been designed with no pitch control but which by design stall out at specific power outputs and require a secondary system for protection in the case of loss of load or high winds. Fourth, rotors can be automatically turned out of the wind for speed control. Feathering control systems currently in use all require active RPM sensors to activate hydraulic systems, some with the assistance of microprocessors.

In order to be economically feasible for rural and residential use today, wind turbines operating in the three to six kilowatt regime must be extremely reliable, low cost, low maintenance systems with longevity on the order of twenty years. The system must accommodate gusts on the order of 125 miles an hour and continue operating in any weather conditions including ice buildup on the blades. Because of the extrememly harsh environment and longevity of the installation, simple mechanical systems are greatly preferred to electronic apparatus. In addition, some means for manual shutdown from the ground, particularly when servicing the unit, is most desirable. To protect the system from large amplitude vibrations caused by mechanical failures such as loss of a blade or excessive ice buildup, it would be extremely desirable for the system to shut itself down automatically.

SUMMARY OF THE INVENTION

The general object of the invention is to control torque to the alternator in constant speed (synchronous alternator) variable pitch wind turbine by means of a reliable dynamic mechanical system providing for automatic and manual shutdown.

According to the invention, in a pitch control system for a wind turbine, a mechanical control system changes pitch angle of the rotor blades collectively in response to blade pitch moment. The control system is designed to be used with a downwind constant speed two-bladed horizontal axis teetering hub wind turbine. Pitch placement controls torque for a synchronous alternator connected to the electrical power grid. The pitch control system is manually lockable from the ground in run or shutdown modes. An automatic shutdown mode provides fullfeathering for for protection from large amplitude vibrations or loss of the electrical grid.

In the preferred embodiment, rotor rotations transmitted to a coaxial spool rotating on an axial spring-biased slider mechanism. Dual pitch links connected between the spool and blade roots determine the pitch angle. A spring-loaded cam is shaped to establish a predetermined relationship between blade pitch moment and pitch angle. The control mechanism can be locked in the run condition or switched manually or automatically to a feathering shutdown mode in which minimum spring bias is applied to the slider.

BRIEF DESCRIPTION OF THE DRAWING

FIG. 2 is a side view in elevation of the wind turbine of FIG. 1.

FIG. 3 is a side view of the wind turbine with the housing removed, portions being shown in phantom.

FIG. 12 is a detail side view of the pull out lock mechanism of FIG. 3.

FIG. 14 is a graph of power output versus windspeed.

DESCRIPTION OF THE PREFERRED EMBODIMENT

Figure 1:
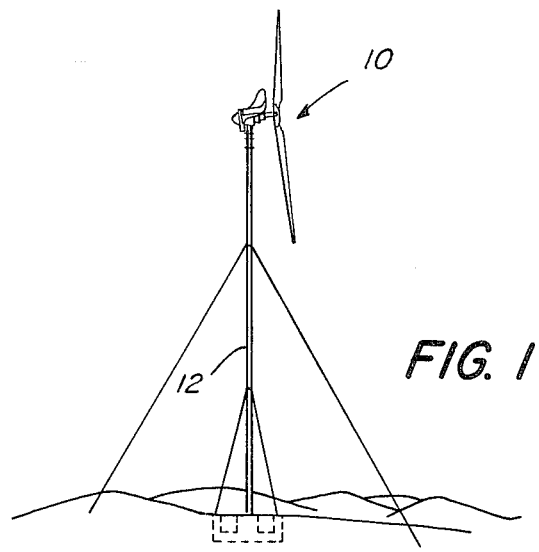
FIG. 1 is a perspective view of a typical installation for a wind turbine according to the invention.

As shown in FIGS. 1, 2 and 3, a downwind two-bladed horizontal axis wind turbine 10 is rotatably mounted for free yawing on a guyed wooden pole tower 12. In the preferred design, the wind turbine is a line interface unit using a direct drive synchronous alternator 14 (FIG. 3) supplying three to six kilowatts of single phase 60Hz 240 VAC power at wind speeds from 15 to 20 MPH. (FIG. 14) The 9 meter (diameter) rotor 16 employs a teetering hub assembly 18 with "delta 3" and two solid laminated wood blades 20 and 22.

In a synchronous alternator wind turbine of the type described herein, connection of the alternator 14 directly to the local electrical power grid tends to force the directly coupled rotor and alternator to rotate at a constant speed determined by the rotor configuration, in this case about 120 RPM. The rotor is coupled via drive shaft 24 to the alternator 14. The regime of wind velocities including gusts comprises speeds from zero to well over 100 MPH. The resulting torque transferred from the rotor blades 20 and 22 through the hub 18 to the drive shaft and coupling to the alternator vary widely as a function of the wind speed. Since the rotor of the alternator 14 is electromagnetically constrained to a given speed, the drive train can be overstressed by excessive torque from the rotor 16. Thus, drive shaft 24 is preferably connected to the rotor of the alternator 114 by means of an elastomeric shock absorbing coupling (not shown). The elastomer employed in the drive shaft alternator connection is preferably a LCD dynaflex coupling from Lord Kinematics. Use of this type of coupling may prove to be unnecessary in certain designs. The invention employs a "soft" rotor 16 having not only the capability of teetering (i.e., out of the plane normal to the rotor axis) but also of automatically reducing the pitch angle of the blades 20 and 22. In this manner, torque induced stress can be mitigated and to a large extent controlled so that the torque output of the rotor is made less dependent on wind speed.

Figure 4:
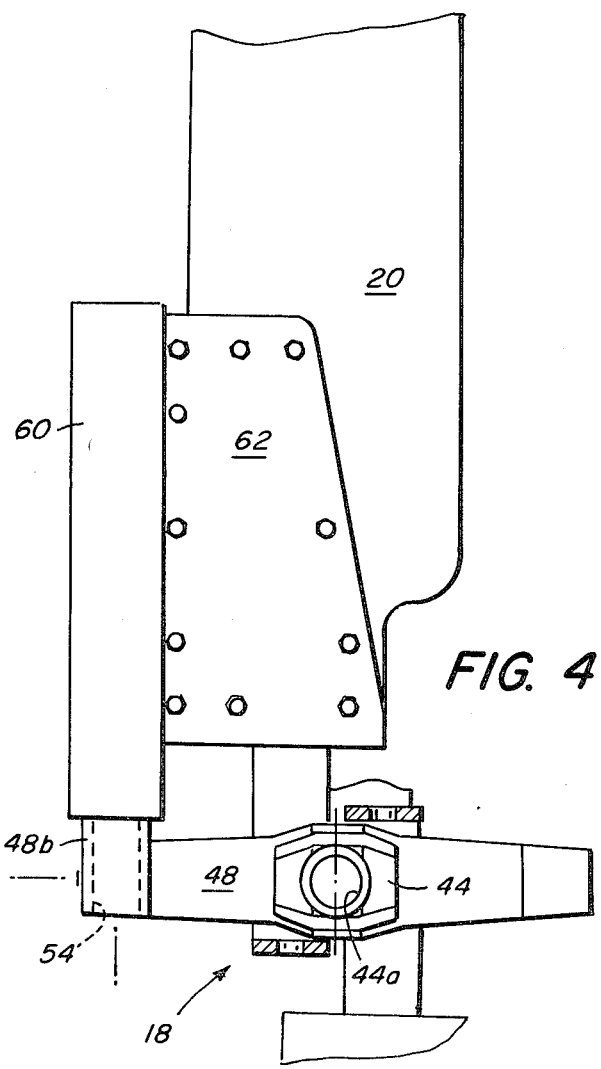
FIG. 4 is a cross sectional view of the wind turbine carriage and yaw bearings.

As shown in FIGS. 3 and 4, the wind turbine 10 is connected to the top of the tower 12 by means of a hollow cylindrical pedestal 26 having upper and lower yaw bearings 28 and 30 rotatably receiving a smaller diameter hollow cylindrical stub column 32 extending vertically upwards through an upper seal 34 and forming a mounting bracket 32A to which the main wind turbine carriage 36 is bolted. Main support tube 38 is rigidly mounted on the stub column 32 by means of a carriage bracket. The components of the bracket include a flange mounting plate 36A which is bolted to the similar flange plate 32A of the stub column. A pair of upright U-shaped brackets 36B and 36C rigidly clamp the main support tube 38. The geometry of the stub column 32 and carriage 36 is such that the drive shaft axis is elevated toward the rotor 18 by four or five degrees. The support tube is welded to the carriage 36 as shown in FIG. 4. To the left of the carriage 36 as viewed in FIG. 3, a nose housing 40 encloses the alternator 14. A main housing or shroud 42 is attached to the nose housing 40 and carriage 36 and provides a rudder like vane 42A for steering the wind turbine into the wind. (FIG. 2)

Figure 5:
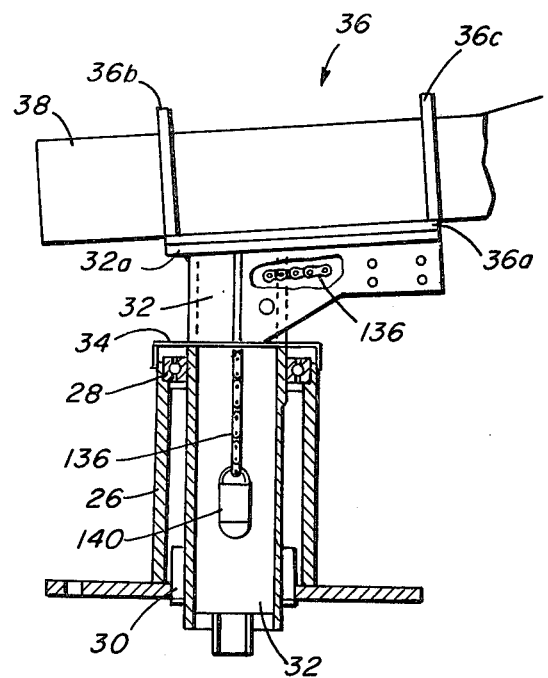
FIG. 5 is a plan view of the rotor of the wind turbine of FIG. 3 as viewed from the alternator.
Figure 6:
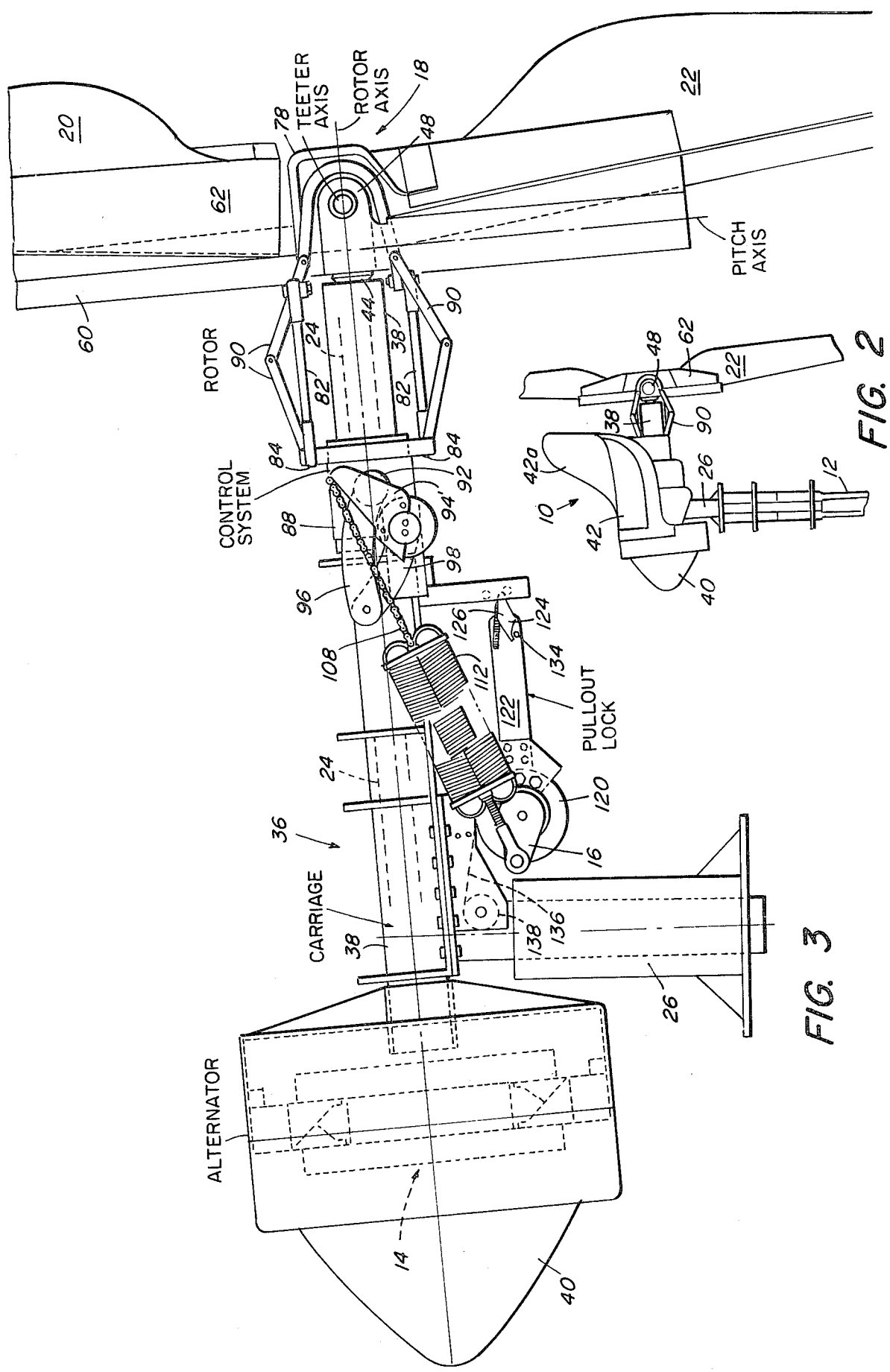
FIG. 6 is a detailed partial cross-sectional view of the hub/teeter assembly without the blade shafts.

The drive shaft 24 is journalled in the main support tube 38 and is drivingly connected at the forward end to the alternator 14 and at the opposite end via the teeter hub 18 to the rotor 16. As shown in FIGS. 5 and 6, the teeter hub 18 includes a central yoke shaped teeter shaft connector 44 having keyed coaxial opening 44a which receives the trailing end of the drive shaft 24 and is rigidly affixed thereto. The teeter shaft connector yoke 44 is rigidly clamped to a transverse teeter shaft 46. The two-part rotor hub 48 surrounds the teeter shaft connector 44 and teeter shaft 46 and is resiliently connected to the opposite ends of the teeter shaft 46 by means of sleevelike elastomeric dampers or flexure bearings 50 affixed to the ends of the teeter shaft 46 and pressfit withing the cylindrical openings 48a in the rotor hub 48. The openings 48a are sealed by rotor hub caps 52 if desired.

Figure 7:
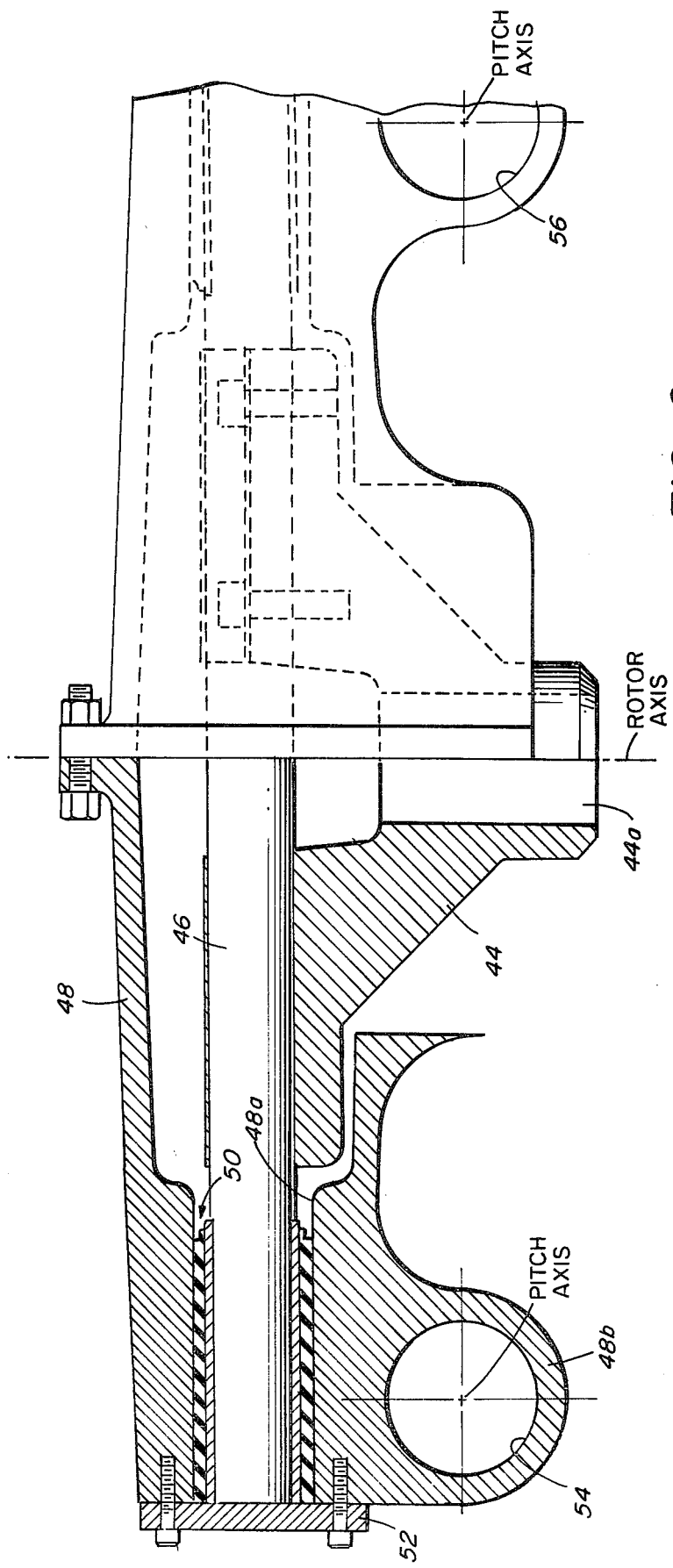
FIG. 7 is an end view of the rotor blade asembly with portions in cross section illustrating the teeter hub and blade pitch bearings.
Figure 8:
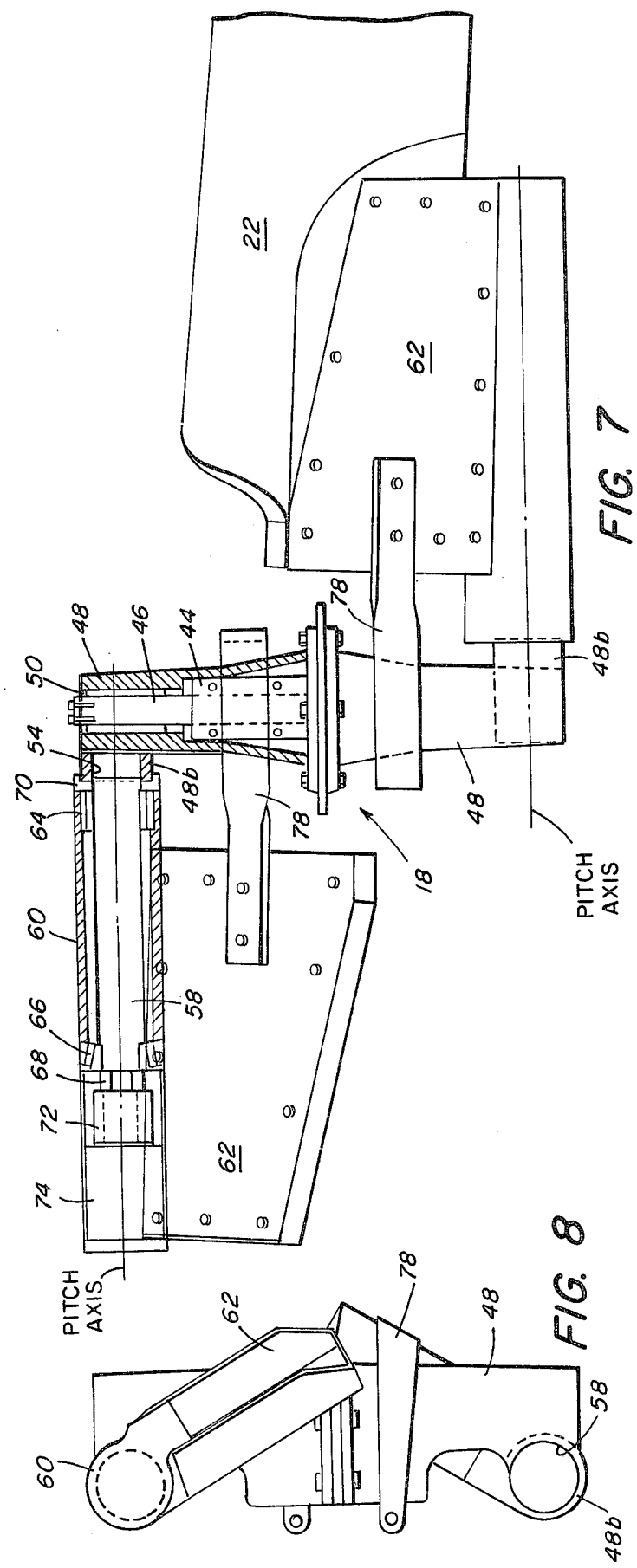
FIG. 8 is a side view of the rotor hub taken along lines 8-8 in FIG. 7.

Depending from the outer ends of the rotor hub adjacent to the elastomeric bearings 50 are a pair of parallel cylindrical pitch shaft sleeves 48b with openings 54 and 56 having respective cylindrical axes defining the pitch axes of the respective rotor blades. The paralled pitch axes are displaced from the rotor axis and lie in a common plane normal to the rotor axis displaced inwardly (toward the alternator) from the teeter axis. The cylindrical sleeve 48b of the hub 48 receives a pitch shaft 58 which is affixed thereto as shown in FIG. 7. A blade root connection cylinder 60 is coaxially received on the pitch shaft 58 for pivoting about the pitch axis. The blade root connection cylinder 60 carries a blade mounting bracket 62 which receives and clamps the inboard larger end or blade root of the respective rotor blade 20. Blade root connection cylinder 60 is supported on pitch shaft 58 by means of inner and outer cylindrical bearings 64 and 66. Inner bearing 64 is preferably or sleeve bearing composed of a torrenting inner race and a garfil bearing while the outer bearing 66 comprises a tapered roller bearing. Hex nut 68 prestresses the disc spring 70 for proper loading the tapered roller bearing. The blade root connection cylinder also includes a rotary damper adaptor 72 and rotary damper 74 both coaxial with the pitch axis. Blade 22 is similarly connected to the rotor hub 48.

The rotor hub assembly 18 is designed to accommodate three functions. First, it attaches the wooden blades 20 and 22 to the main shaft 24. Second, it provides limited teetering freedom to "soften" the rotor to absorb some of the eratic loads due to wind shifts and gusts. Third, the hub accommodates the passive mechanical control system. The hub itself employs elastomeric bearings 50 for teeter freedom. Elastomerics provide a self-restoring moment to the joint and can be easily tuned to mechanical specifications while maintaining extremely high reliability and longevity. The hub itself is made from cast and machined steel elements. The blade root is attached to the blade shaft 60 by steel blade root plates and a blade root casting. The outer blade bearing is a tapered roller bearing which takes blade centrifugal and thrust loads. This bearing is preloaded by spring washers to avoid any false brinelling from cyclic gravity loads. The inner bearing is a plain sleeve bearing. The rotary adjustable hydraulic damper 74 is included to avoid the possibility of so called pitch-flap instability. The damper is placed so that it acts directly on the unstable interface without linkage sloppiness. This rotary damper may prove to be an unnecessary precaution in certain designs.

Figure 11:
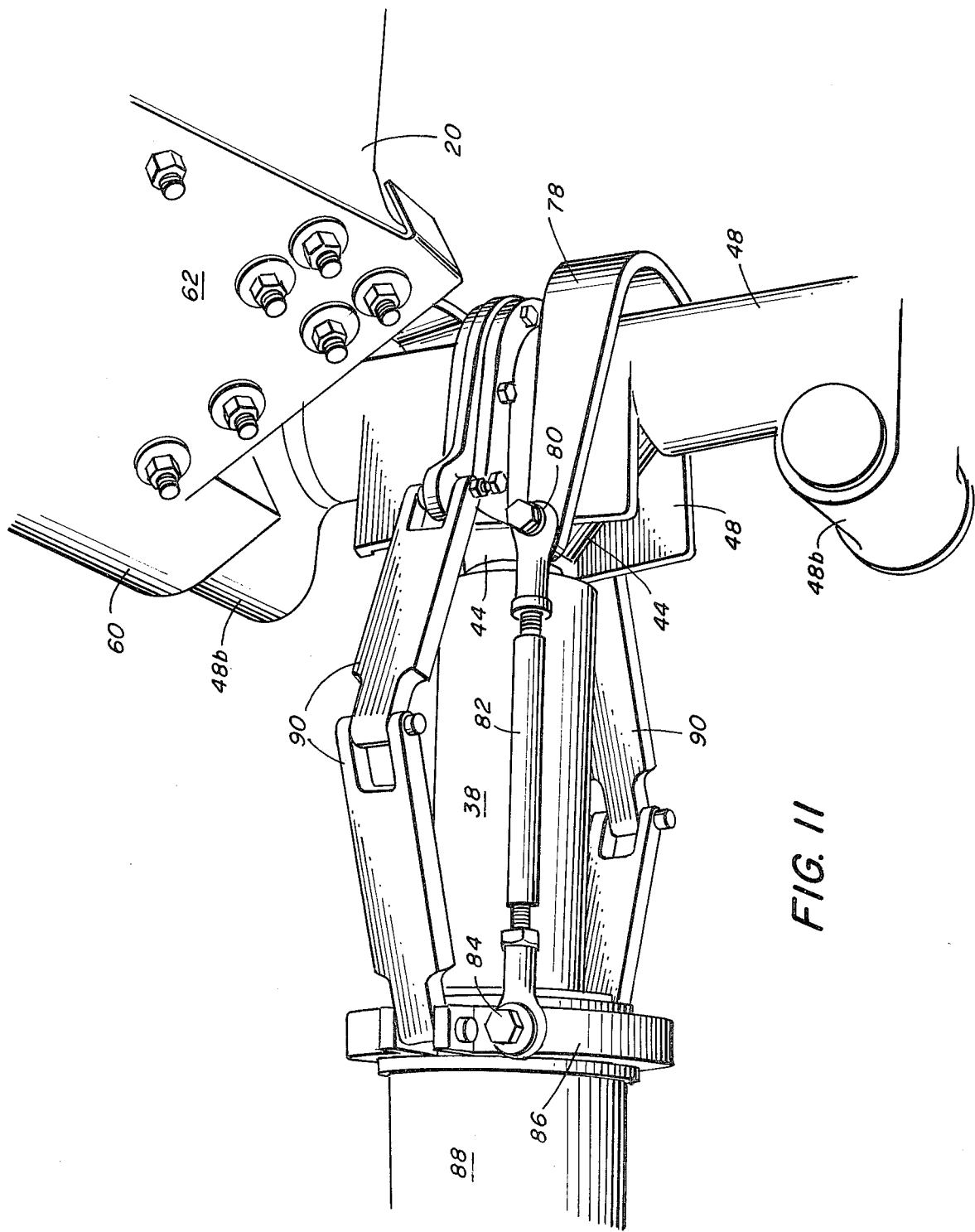
FIG. 11 is a detail perspective view of the rotor hub and control system interconnection illustrating the pitch links in particular.

The elements of the pitch control system are illustrated in FIGS. 3, 7, 9A and 9B. Attached to the inboard side of each blade mounting bracket 62 is a respective curved rigid pitch link 78 which extends around the outside of the hub 48. The end of each pitch link 78 is connected to a ball and socket joint 80 (universal joint) and solid connecting rod 82 to another ball and socket joint 84 connected to a spool 86 rotatably mounted via four-point throwout bearing 87 on a cylindrical slider 88 slidably received coaxially on the main support tube 38. Hinged dual arm linkage 90 (FIG. 11) connects the spool 86 to the mating flange of the two halves of the rotor hub 48 for rotation therewith irrespective of the axial location of the cylindrical slider 88.

Figure 9:
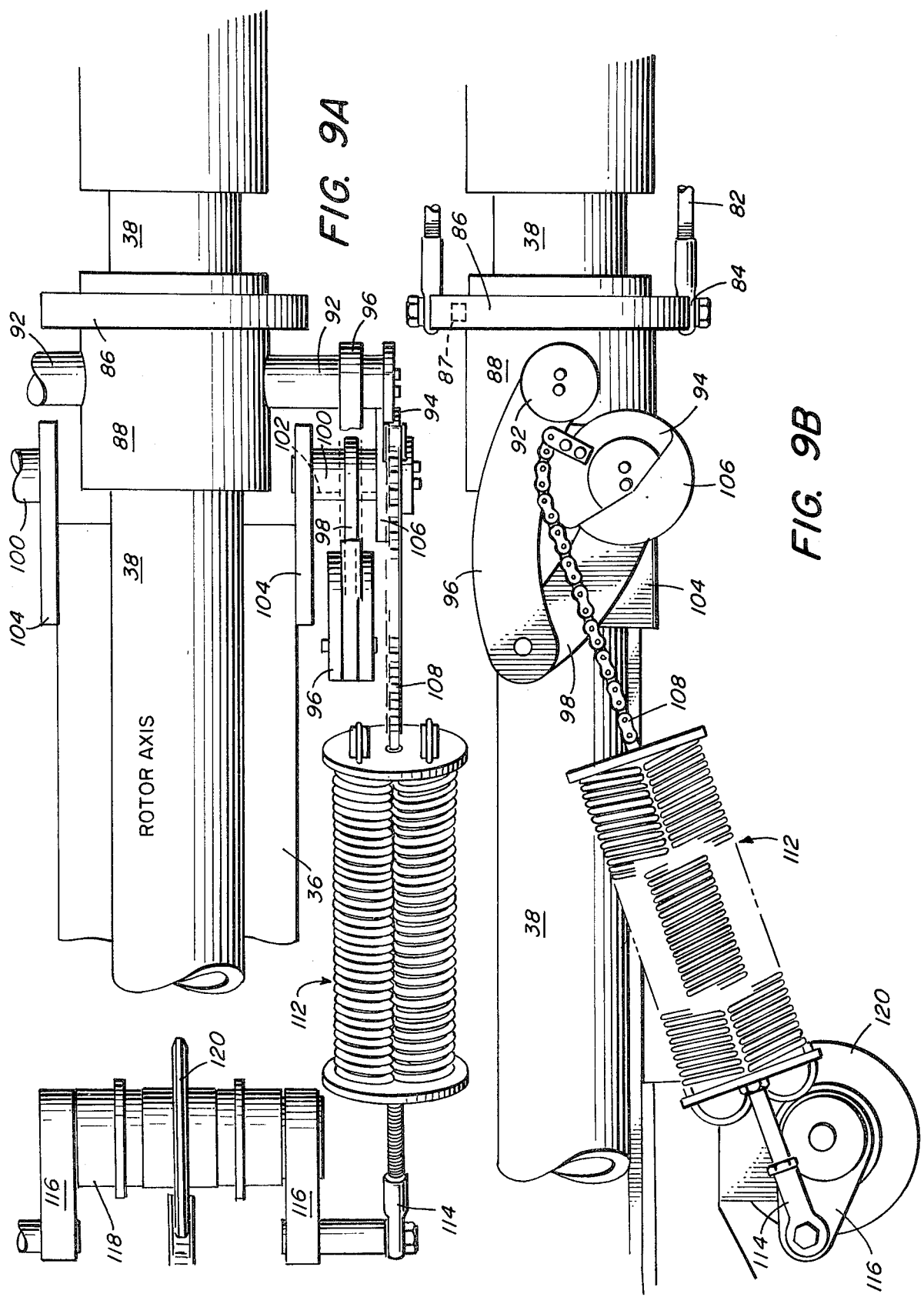
FIG. 9A is a top view of the rotor control system of FIG. 3 with portions broken away.
FIG. 9B is a side view of the rotor control system of FIG. 9A.

Slider 88 has an inner bronze or sleeve 88A forming the bearing surface of the slide which interfaces with the main support tube 38. Slide 88 has a pair of outwardly extending control arms 92 perpendicular to the rotor axis. The control arms 92 on either side of the slider 88 are connected to identical spring loaded cam driven throw out mechanisms on either side of the main support tube 38 as shown in FIGS. 3, 9A, 9B and 10. Each control arm 92 is operatively connected to a roller cam 94 via curved double throw links 96 and 98. Upper link 96 is pivotally connected to control arm 92 at one end and the other end is pivotally connected to one end of lower curved link 98. The other end of link 98 is rigidly connected to a cylindrical cam shaft 100 rotatably mounted on shaft 102 which extends transversely (parallel to the control arm 92) from a mounting bracket 104 rigidly attached to the side of the carriage 36. Cam 94 is rigidly connected to circular cam mounting plate 106 which is rigidly connected for rotation with the cam shaft 100. Two different types of cams 94 and 94' are shown in FIGS. 9B and FIG. 3, respectively. One end of roller chain 108 is connected to a chain clip 110 bolted to the periphery of the cam 94. The other end of chain 108 is connected via spring assembly 112 to connecting rod end 114 which in turn is pivotally connected to bell crank 116 as shown. The bell cranks 116 associated with the control mechanism for either control arm 92 of the slider 88 are rigidly connected to transverse pullout shaft 118 rotatably connected to the carriage 36 and carrying central sprocket 120.

With reference to FIG. 3, pullout lock arm 122 is rigidly connected to the sprocket 120 and extends radially therefrom. At the outer end of pullout lock arm 122, a spring loaded latch cam 124 is pivotally connected to the arm 122 at point 126. Vertically depending ladder-like trip bracket 128 is pivotally connected to the bottom of the carriage 36. Trip bracket 128 includes a pair of vertical side members having a pair of rollers 130 and 132 connected horizontally between the side members. Lower roller 132 is contacted by the end of the cam 124 as shown in FIG. 3 and the other end of the latch cam 124 is forced against lower stop 134 on arm 122.

A second length of roller chain 136 is connected at one end to the periphery of sprocket 120 and extends forward to the tower mounting stub column 32 over an idler pulley 138 rotatably mounted within the stub column 32 and down the interior of stub column to jib furling swivel 140 as shown in FIG. 4. The swivel 140 of FIG. 4 is designed to be connected via a cable (not shown) to a crank-operated ratchet type winch at the bottom of the tower of FIG. 1 to be operated by hand from the ground.

Figure 10:
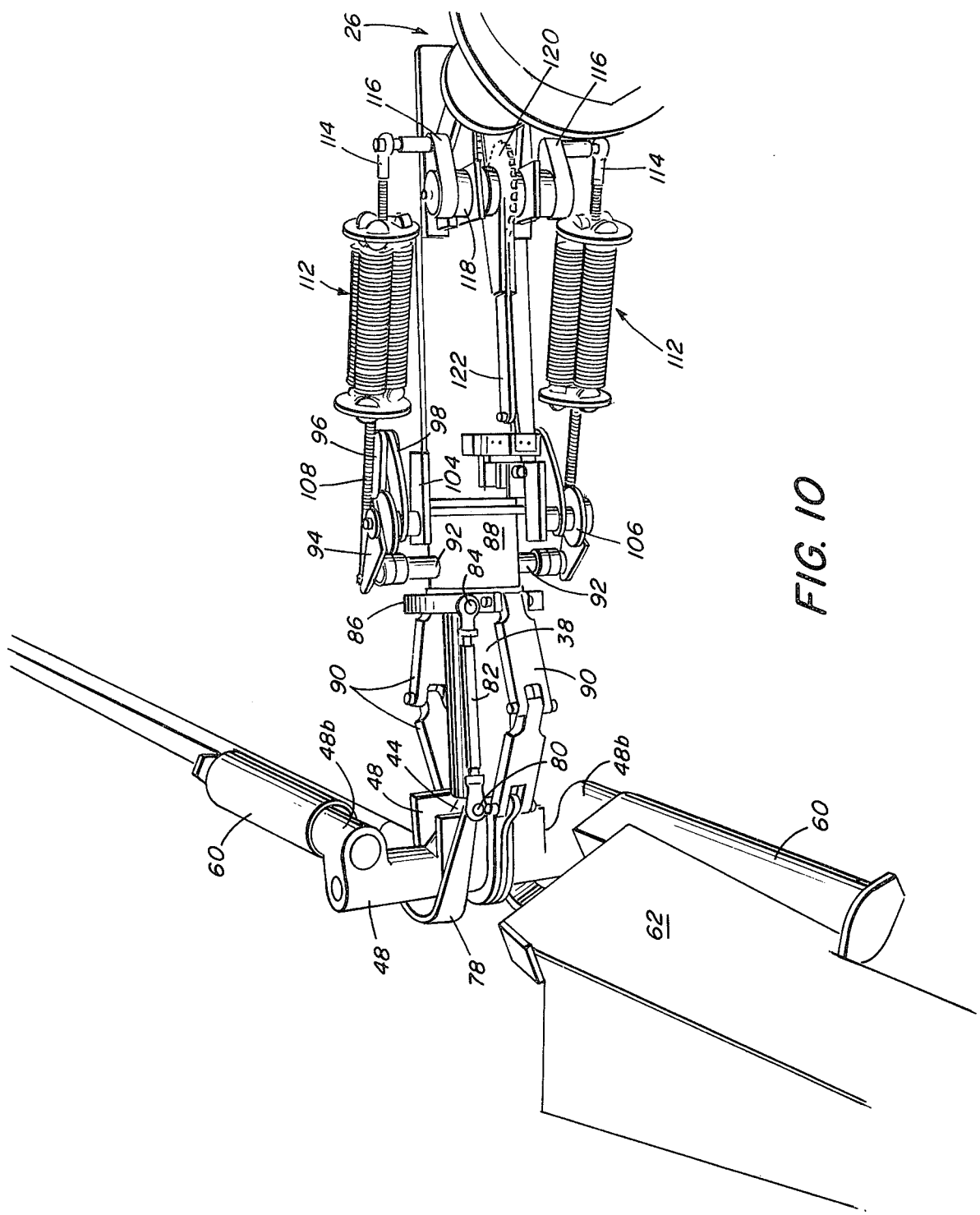
FIG. 10 is a perspective view of the wind turbine of FIG. 3 from the ground illustrating the rotor control system of the invention.

The details of the pullout lock mechanism are shown in FIG. 12. In addition to rollers 130 and 132 on the trip bracket 128, a trip wire 136 extends forward toward the sprocket 120 from a lower position on latch ladder 128. The upper end of the pivoted trip bracket 128 is connected to the plunger of solenoid 138 which is rigidly connected to the bottom of the carriage 36. Solenoid 138 is designed to be electrically connected to a conventional vibration sensor having an electrical output indicative of a predetermined large amplitude vibration condition and if desired to a switch on the ground. Actuation of the solenoid results in the trip bracket 128 pivoting counterclockwise as shown in FIG. 10 free of the latch cam 124 allowing the pullout lock arm and sprocket 128 to rotate clockwise under the action of spring 112 (FIG. 3).

In operation, as shown in FIGS. 1, 2, and 3, because of the yaw bearings in the pedestal 26, (FIG. 3) and vane 42A of the exterior housing (FIG. 2) and downwind rotor 16, the wind turbine 10 automatically points its nose 40 into the wind such that wind blows in the direction from the nose housing 40 toward the rotor 16 as shown in FIG. 3. The angular moment resulting from wind loading on the rotor blades 20 and 22 applies torque to rotate the drive shaft 24 and alternator 14 as well as the rotor 16 itself. While rotating about the rotor axis, the rotor hub 48 carrying the blades can undergo limited angular teetering on the teeter axis. The elastomeric bearings 50 automatically provide excursion limits and damping to restrict the teetering motion of the rotor. Simultaneously, the flexible linkage 90 causes synchronous rotation of the spool 86 on slider 88. The pitch links 78 connected to the spool 86 establish the pitch angle of both blades about the simultaneously respective pitch axes. The axial position of the slider 88 which carries the spool 86 thus positively determines the pitch angle of both blades. The position of the slider 88 in turn is governed by the resultant of forces derived from the tension in the spring assemblies 112 on the one hand and the wind pressure on the rotor blades. These two opposing forces coact through the throw out linkage for the slider 88 and the connecting rods 82 spinning with the rotor and the spool 86. When there is no wind, the spring tension is allowed to shorten the spring assembly 112 thus rotating the cam 94' and lower link 98 counterclockwise as shown in FIG. 3, retracting the slider 88 to its farthest forward position leftwards as viewed in FIG. 3, producing the flattest angle of attack (maximum aspect ratio) for the rotor blades. In this condition as shown in FIG. 3, the blades are ready to respond to the first upcoming wind. As the wind increases, the inertia of the components connected to the drive shaft will be overcome by the torque produced by the rotor, at which point the rotor 16, spool 86, drive shaft 24 and rotor of alternator 14 begin to rotate.

As wind speed increases, the blade pitch moment overcomes the spring tension at the lowest elongation of the spring assembly 112 and the slider 88 slides aft to a new position where the wind induced pitch moment is balanced by the increased spring force. For a given wind speed, there is one equilibrium pitch angle. For example, as the pitch angle is increased from an equilibrium position, the air foil angle of attack decreases reducing the coefficient of lift and thus the lift force. The aerodynamic moment is now less than the spring induced control moment which thus actuates the blade pitch linkage decreasing the pitch angle until equilibrium is again reached. The aerodynamic restoring force maintains equilibrium. For constant RPM operation ("loaded" mode) in which the alternator is connected directly to the electrical grid, a change in wind speed moves the system to a new equilibrium pitch or feather angle as shown in FIG. 5. The predominant effect of an increase in wind speed is an increase in angle of attack of the rotor blade which increases the lift coefficient and lift force. This difference between aerodynamic and control moments tends to increase the pitch angle until a new equilibrium point is reached. The control moment $M_C$ is a function of pitch angle and determines the equilibrium pitch angle at each wind speed. (FIGS. 13A and 13B) The rotor power output, being dependent on wind speed and pitch angle is thus determined by this $M_C$ function. In addition, preferably the blade center of gravity is offset from the rotor axis which results in a positive pitching moment due to rotor angular velocity resulting in further sensitivity to rotor overspeed conditions.

Figure 13A:
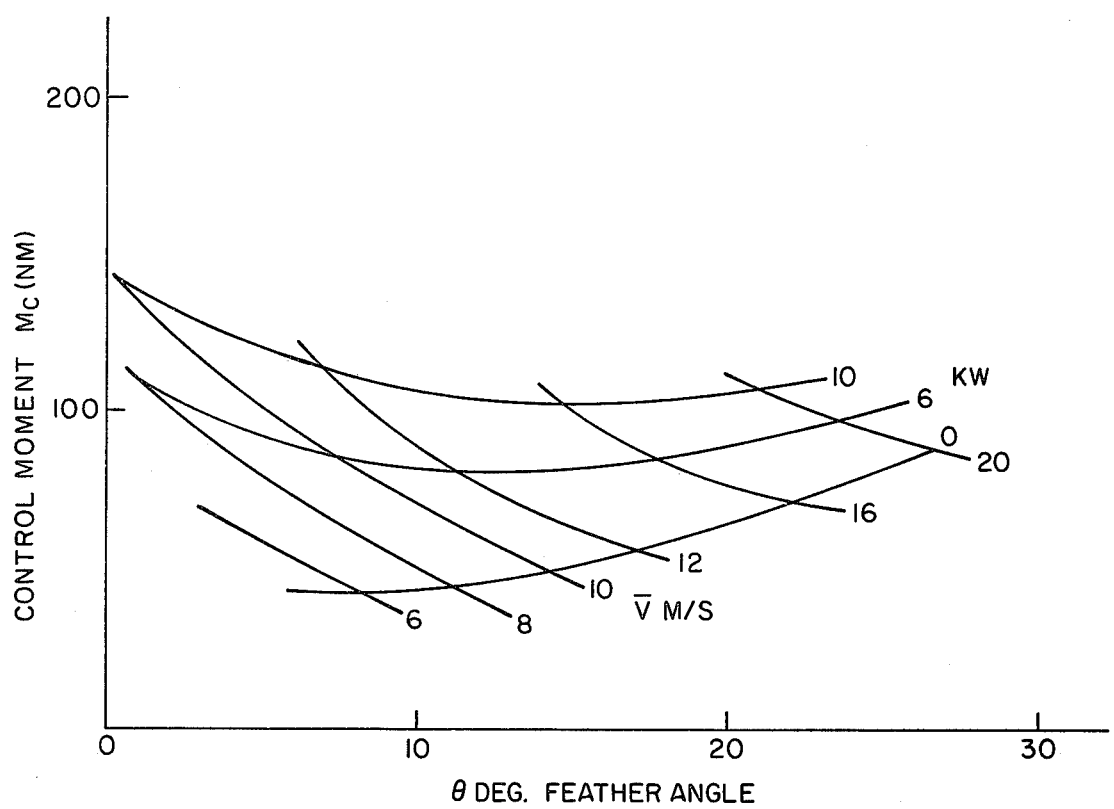
FIGS. 13A and 13B are graphs of control moment versus feather angle in the loaded and unloaded modes respectively.
Figure 13B:
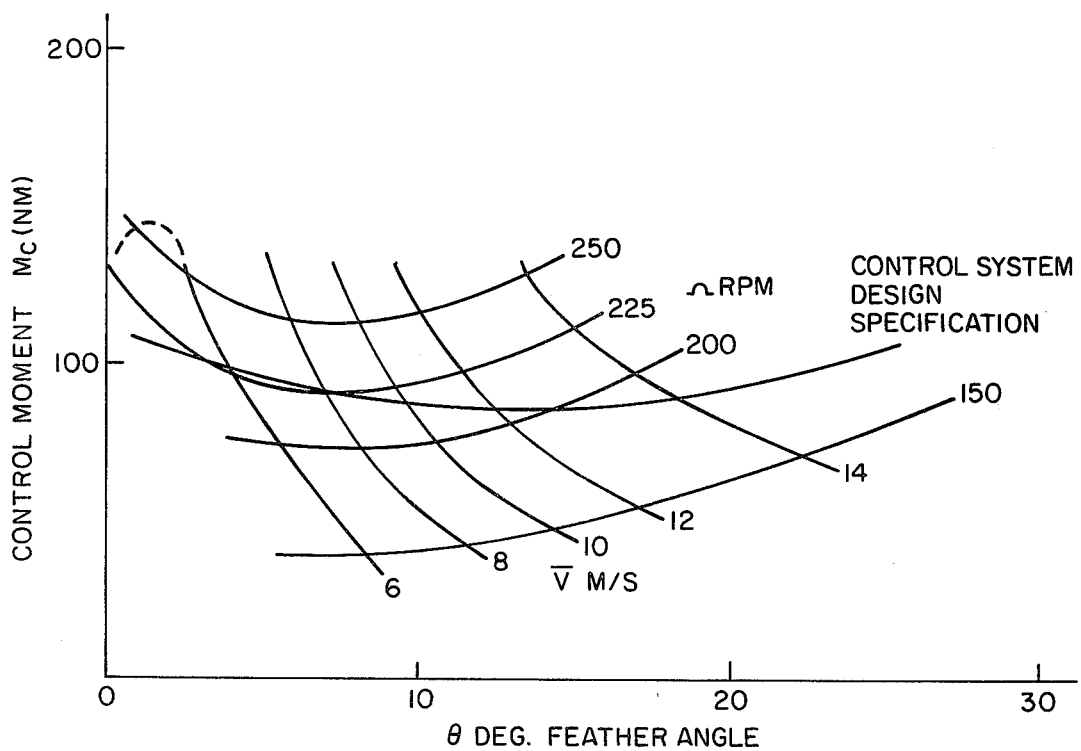

The profile of cam 94' (FIG. 3) or 94 (FIG. 9B) is designed to make the relationship between control moment and pitch angle match the six kilowatt curve in FIG. 13A.

The mechanical shutdown mechanism is an integrated design which provides machine protection under the following modes of machine operation or conditions: manual shutdown and start up at ground level; machine protection against vibration by self shutdown; and machine shutdown as a result of loss of the electrical grid (unloaded mode).

Manual shutdown is accomplished via the cable 136. From the position shown in FIG. 3 and 12, pulling the cable 136 from the ground via a winch (not shown) causes the lever arm 122 to rotate to the point where the latch cam 124 is tripped by the upper trip roller 130 which moves the spring to an over center position and locks the cam against upper stop 135. When the cable 136 is released, the lever arm 122 swings free of the trip bracket 128 thus releasing the tension on the spring assembly 112 allowing the cam 94' to rotate clockwise and permitting the slide 88 to move aft (to the right in FIG. 3) to feather the rotor blades. As the latch cam 124 swings below the lower trip 132 it momentarily engages a spring trip 136 which recocks the cam to the lower stop 134. To resume the run position, the operator pulls down on the chain 136 again via a winch and rotates the lever arm 122 into engagement with trip 132. The tension in spring assembly 112 keeps the end of the latch cam 124 in engagement with stop 132 so the system is locked in run condition.

Automatic shutdown is accomplished via the solenoid 138 of FIG. 12. The solenoid coil 138 is normally energized such that the trip bracket is in the run position in which it can be engaged by the latch cam. The solenoid coil is supplied with current directly from the grid and is placed in series with two normally closed switches: a manual switch on the ground, for example, at the base of the tower, and a vibration sensor located on the wind turbine carriage 36. The vibration sensor switch is normally closed and latches open in response to predetermined large amplitude vibrations. The solenoid 138 releases its plunger and throws out the trip bracket 128 for automatic shutdown in response to any one of three events: loss of grid, manual turn off or excessive vibration.

A possibly preferred way of acomplishing automatic and manual shutdown which is currently undergoing evaluation, is to provide the latch mechanism at the ground in conjunction with the winch. One technique under investigation is a winch latch which is automatically engaged when the winch reaches a predetermined limit position and can be disengaged manually or electrically by means of a solenoid, for example, energized in a manner similar to that described for solenoid 138. The winch latch mechanism would obviate the lever arm 122 and latch mechanism shown in FIGS. 3 and 12.

The passive mechanical pitch control system described above is the first design to employ blade feathering control which utilizes the blade forces themselves to regulate the power available to the generator, i.e., torque for a constant speed machine and secondly to operate as an RPM regulator if the generator load is ever lost and shutdown fails. The shutdown mechanism is an intergral feature of the rotor control system and facilitates manual and automatic shutdown. In effect, the rotor blades are sensors which transmit control information to the rotor control system. In addition, the blades supply control actuation force, via blade pitch moment. Allowing the blade loads themselves to provide the forcing function to the control mechanism avoids the complex mechanisms of the prior art. Rapid response in inherent with the control system according to the invention. Translating blade loads into control pitch involves only the pitch inertia. There is no need to sense an indirect parameter. Most other control systems sense an indirect condition such as an RPM change which involves a much larger inertia. The all mechanical system avoids the complexities and uncertainties of electrical equipment. This is particularly important in the harsh operating environment of the typical wind turbine. Even without the shutdown mode, the rotor control system provides protection against over speed conditions by allowing coordinated elastic control of pitch angle.

Further details of the preferred embodiment of the invention disclosed herein are described in Final Technical Report entitled "Development of a 4KW SWECS" prepared by the assignee North Wind Power Company, Inc., P.O. Box 556, Moretown, Vt. 05660, under Sub Contract No. PFO8501C under U.S. Department of Energy Contract No. DE-ACO4-76DPO3533. Copies of the foregoing technical report are available from the National Technical Information Service.

The foregoing system describes a preferred embodiment with specific design criteria and components for illustration. Many variations and modifications can be made in the foregoing system without departing from the basic principle or spirit of the invention described herein. For example, various means of applying resistive or restoring force to the control arms of the slide 88 can be envisioned. The invention is not limited to the spring loaded cam and throw out linkage described herein. Nevertheless, the use of cam 94 provides an excellent convenient way to "profile" the resistive force as a function of slider displacement to establish different relationships for pitch moment and pitch angle.

What is claimed is:

1. A constant speed wind turbine of the type comprising
   a tower-mounted free yawing carriage having vane means for aligning said carriage with the wind,
   a drive shaft defining a substantially horizontal rotor axis mounted for rotation in said carriage, and
   a wind-powered electrical generator operatively coupled to one end of said drive shaft having electrical terminals adapted to be connected to an electrical power grid, wherein the improvement comprises
   a rotor with variable pitch blades drivingly coupled coaxially to the other end of said drive shaft, and
   mechanical control means connected between said rotor and said carriage for establishing the pitch angle of said rotor blades collectively as a direct predetermined function of the blade pitch moment.

2. The wind turbine of claim 1, wherein said mechanical control means includes
   a rotating connecting element coaxially rotatably mounted on said drive shaft,
   drive link means for synchronously rotating said connecting element with respect to the rotation of said rotor about the rotor axis,
   pitch link means for establishing the pitch angle of said rotor blades collectively in accordance with the axial position of said connecting element along the rotor axis, and
   means for varying the axial location of said connecting element as a function of the rotor blade pitch forces transmitted thereto via said pitch link means.

3. The wind turbine of claim 2, wherein said location varying means includes
   a coaxial slider axially slidably mounted on said carriage, coaxial bearing means for rotatably mounting said connecting element to said slider at a predetermined fixed axial position with respect to said slider, and elastic linkage means connected between said slider and said carriage for applying a predetermined variable axial force to said slider in opposition to said blade pitch moment.

4. The wind turbine of claim 3, wherein said elastic linkage means includes a spring-loaded cam means for establishing a predetermined relationship between pitch angle and pitch moment from a minimum to a maximum pitch angle, inclusive.

5. The wind turbine of claim 3, wherein the improvement further comprises shutdown means for releasing the tension in said elastic linkage means to a minimum level for full feathering of said rotor blades.

6. The wind turbine of claim 5, further comprising manual means for operating said shutdown means.

7. The wind turbine of claim 5, further including vibration sensor means operatively connected to said carriage for producing an output signal in response to a predetermined large amplitude vibration threshold indicative of an unstable rotor condition, said shutdown means including means responsive to said vibration sensor means output signal for releasing the tension in said elastic linkage means.

8. The wind turbine of claim 3, wherein the improvement further comprises means for latching said elastic linkage means in a run condition and electronic means for releasing said latch means in response to a shutdown command, and vibration sensor means for producing a shutdown command in response to vibration above a predetermined amplitude.

9. The wind turbine of claim 8, wherein the improvement further comprises means operatively connected with said electrical generator for producing a shutdown command in response to disconnection from the electrical power grid.

10. The wind turbine of claim 1, wherein said rotor is a downwind rotor.

11. The wind turbine of claim 10, wherein said rotor includes a rotor teeter hub assembly with an inner teeter shaft member fixed to said drive shaft for rotation therewith having pair of aligned opposite radial arms defining a coaxial teeter axis, an outer teeter hub resiliently pivotally mounted on said radial arms for teetering on said teeter axis carrying a pair of spaced parallel blade mounting hinges extending in opposite directions in a plane substantially normal to said drive shaft and defining respective pitch axes transverse to teeter axis and displaced therefrom, and said rotor blades having inboard blade roots pivotally connected to said blade mounting members.

12. A downwind horizontal axis two bladed wind turbine of the type comprising a free yawing carriage having vane means for aligning said carriage with the wind, a drive shaft defining a substantially horizontal rotor axis mounted for rotation in said carriage and a wind-driven electrical generator operatively coupled to one end of said drive shaft, wherein the improvement comprises a downwind rotor assembly including a rotor teeter hub assembly with an inner teeter shaft member affixed to said drive shaft for rotation therewith and having a pair of aligned opposite radial arms defining a teeter axis, an outer teeter hub resiliently privotally mounted on said radial arms for limited teetering action on said teeter axis and carrying a pair of space parallel blade mounting hinges extending in opposite directions defining parallel pitch axes transverse to and displaced from said teeter axis in a plane nominally normal to drive shaft, a pair of rotor blades having inboard blade roots connected respectively to said blade mounting hinges, and elastic control means for establishing the pitch angle of said rotor blades as a function of the blade pitch moment.

13. The wind turbine of claim 12, wherein said control means includes means connected between said rotor and said carriage for establishing the pitch angle of said rotor blades collectively as a direct predetermined function of the blade pitch moment.

14. The wind turbine of claim 13, wherein said control means includes a rotating connecting element coaxially rotatably mounted on said drive shaft, drive link means connected between said outer teeter hub and said connecting element for synchronously rotating said connecting element with respect to the rotation of said rotor assembly about the rotor axis, pitch link means connected between said connecting element and an identical point on each blade root displaced radially from the pitch axis for establishing the pitch angle of said rotor blades collectively in accordance with the axial position of said connecting element along the rotor axis, and means for varying the axial location of said connecting element as a function of the rotor blade pitch forces transmitted thereto via said pitch link means.

15. The wind turbine of claim 14, wherein said location varying means includes a coaxial slider axially slidably mounted on said carriage, coaxial bearing means for rotatably mounting said connecting element to said slider at a predetermined fixed axial position with respect to said slider, and elastic linkage means having run the shutdown positions connected between said slider and said carriage for applying predetermined variable force thereto in opposition to said blade pitch moment.

16. The wind turbine of claim 15, wherein the improvement further comprises said elastic linkage means being responsive to a shutdown command for selecting the shutdown condition in which tension on said slider is released to the minimum level, and electronic means responsive to an emergency condition for producing said shutdown command, whereupon said rotor blades are fully feathered for emergency protection.

* * * * *